United States Patent Office 2,760,844
Patented Aug. 28, 1956

2,760,844

TREATMENT OF CHROMATE SOLUTIONS

Sidney V. Fox, Bethlehem, Pa., assignor to Bethlehem Steel Company, a corporation of Pennsylvania No Drawing. Application September 23, 1955,
Serial No. 536,296

11 Claims. (Cl. 23—145)

This invention relates to the reduction of inorganic compounds wherein a catalytic agent is used. More specifically, the invention relates to a method of reduction of an alkali chromate wherein hydrogen and a copper-bearing catalyst are employed.

It has been known that sodium chromate liquor, such as chromate liquor formed by roasting a chrome containing ore with sodium hydroxide and subsequent water leaching, when treated with hydrogen gas in an autoclave at temperatures above 500° F. and at a pressure in excess of 1600 p. s. i. (gage pressure) will produce a precipitate of chromic hydroxide in a sodium hydroxide solution, according to the following equation:

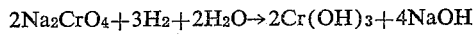

$$2Na_2CrO_4 + 3H_2 + 2H_2O \rightarrow 2Cr(OH)_3 + 4NaOH$$

Upon dehydration, some of which may occur in the autoclave, chromic hydroxide is converted to chromic oxide, as shown in the following equation:

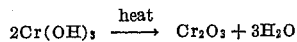

$$2Cr(OH)_3 \xrightarrow{heat} Cr_2O_3 + 3H_2O$$

Even at the elevated temperature and pressure given above, the time required for substantially complete conversion of the sodium chromate to the lower valence form of chromium in chromic oxide is considerable, for example, in a solution containing 5.4% sodium chromate and 6.3% sodium hydroxide, at a temperature of 520° F. and a pressure of 1650 p. s. i., nearly three hours are required to convert 90% of the sodium chromate to chromic hydroxide. Where considerable quantities of sodium chromate liquor are to be used in the conversion process, large autoclaves are necessary in order to handle sufficient liquor to make the process economically feasible.

A major object of this invention is to hasten the reaction in which sodium chromate is converted to chromic hydroxide.

Another object is to reduce the size of handling equipment required in the conversion reaction and thus reduce equipment installation costs.

A further object is to employ, in the process, a catalyst which is relatively inexpensive.

I have found that the use of a copper-bearing catalyst, in conjunction with the reduction of sodium chromate in an autoclave at the proper temperature and pressure, can produce a yield of from 95% to 99% chromium conversion in a matter of 10 minutes. Good yields for chromium conversion have been obtained when using cupric oxide, cupric hydroxide or elemental copper in the form of wire. Cuprous oxide gives very satisfactory results as well. It may be said that with my invention improved results can be obtained with any inorganic or organic copper compound, or with elemental copper in any form.

The results obtained when using a copper-bearing catalyst are much superior to those obtained when using platinum or nickel, metals well known for their catalytic properties. As will be shown later in Table II, comparison between catalysts are made on a surface area basis.

In reacting sodium chromate with hydrogen in an autoclave under the required treatment conditions of temperature and pressure, the copper catalyst may be introduced into the chromate liquor before any treatment of the liquor. If copper oxide or hydroxide is used in the form of a powder, with no catalyst carrier, the catalyst performs effectively, producing a good yield of converted chromium in a relatively short reaction time. However, when no carrier is used the catalyst is lost as far as re-use is concerned, and practically all of the catalyst, when used in this way, will be found as a contaminant of the resultant chromic hydroxide precipitate. I prefer to use a carrier when employing a catalyst in a powder form. In this way the catalyst may be recovered and used over again. Furthermore, contamination of the precipitated product is reduced to a minimum when a carrier is used. For example, by the use of a carrier, the combined carrier and catalyst can be removed from the product by screening. Preferred carriers are chromic oxide pellets, iron oxide pellets, or other materials inert to caustic solutions at elevated temperatures. Asbestos is also a good carrier, but it shows some deterioration in alkaline solutions at high temperatures. When metallic copper is used, either in the form of wire or gauze, it is of course unnecessary to use a carrier. It is necessary, however, when using metallic copper as the catalyst in the form of wire or gauze, to increase the amount of catalyst used due to the lower surface to mass ratio. Cupric oxide and cupric hydroxide, with or without carrier, may be used in amounts in the range of from 0.1% to 3.0%, based on the weight of the solution. In the small quantities required, copper compound catalysts may be used without regard to recovery if contamination is no problem, for these compounds are relatively inexpensive. However, as has been mentioned above, when the copper compound catalysts are used with a carrier, they may be recovered for re-use.

It should be observed that mixtures of copper oxides, copper oxide with copper hydroxide and other combinations of copper and/or copper compounds may be employed.

The following specific examples show the results obtained from actual tests made on various forms of copper-bearing samples, as well as those for some non-copper bearing materials. In the examples, where a copper or nickel compound was used, the material was in the form of a finely divided powder. As these tests were made for the purpose of determining the comparative catalytic effect, no carrier was used. In each case, the powder had a particle size of 20-mesh, or smaller.

EXAMPLE I

A 300 gram quantity of sodium chromate liquor, having a pH of approximately 12, and containing approximately 1.5% chromium (present as sodium chromate) and 5.2% free NaOH, was introduced into a stainless steel autoclave of about 350 ml. capacity. One gram of cupric oxide (CuO) was mixed with the chromate liquor. The liquor in the autoclave was heated to 520° F., then treated with hydrogen by introducing a stream of hydrogen into the autoclave until the pressure registered 1650 p. s. i., the aforesaid pressure and temperature being maintained for a period of 30 minutes. At the end of the treatment, the slurry in the autoclave was cooled to below 200° F., the autoclave vented, and precipitated chromic hydroxide separated from the solution of sodium hydroxide by filtration. The precipitate contained 97% of the chromium originally present in the sodium chromate.

EXAMPLE II

The procedure of Example I was repeated with the exception that the chromate liquor was autoclaved for 10 minutes instead of 30 minutes. Again 97% of the chromium originally present in the sodium chromate was recovered in the precipitate of chromic hydroxide.

EXAMPLE III

The procedure of Example I was repeated, substituting for the catalyst of Example I a catalyst of 1.0 gram of cuprous oxide ($Cu_2O$). A yield of 91% chromium was obtained.

EXAMPLE IV

The procedure of Example I was repeated, substituting for the catalyst of Example I a catalyst of 7.0 grams of cupric hydroxide [$Cu(OH_2)$] in the form of a wet filter cake containing a large percentage of water. A yield of 88% chromium was obtained.

EXAMPLE V

The procedure of Example I was repeated, substituting for the catalyst of Example I a catalyst of 1.0 gram of cupric chromate ($CuCrO_4.2CuO.2H_2O$). A yield of 96% chromium was obtained.

EXAMPLE VI

The procedure of Example I was repeated, substituting for the catalyst of Example I a catalyst of 1.0 gram of cupric sulfate ($CuSO_4.5H_2O$). A yield of 97% chromium was obtained.

EXAMPLE VII

The procedure of Example I was repeated, substituting for the catalyst of Example I a catalyst of 1.0 gram of cupric nitrate [$Cu(NO_3)_2.3H_2O$]. A yield of 99% chromium was obtained.

EXAMPLE VIII

The procedure of Example I was repeated, substituting for the catalyst of Example I a catalyst of 1.0 gram of cupric oleate. A yield of 96% chromium was obtained.

EXAMPLE IX

The procedure of Example I was repeated, substituting for the catalyst of Example I a catalyst of 1.0 gram of copper naphthenate. A yield of 96% chromium was obtained.

EXAMPLE X

The procedure of Example I was repeated, substituting for the catalyst of Example I a catalyst of 1.0 gram of copper acetyl acetone. A yield of 97% chromium was obtained.

EXAMPLE XI

The procedure of Example I was repeated, substituting for the catalyst of Example I a catalyst of 1.0 gram of finely divided metallic copper (precipitated). A yield of 96% chromium was obtained.

EXAMPLE XII

The procedure of Example I was repeated, substituting for the catalyst of Example I a catalyst of 1.0 gram of nickel oxide (NiO). A yield of 46% chromium was obtained.

Further tests were made on some well-known catalysts, such as those containing cobalt, platinum or nickel. In these additional tests, represented by Examples XIII to XVII in Table I, the same conditions governed as in Example I, except for the change in catalyst material. A comparative summary of results, for catalysts tested, is given in Table I below:

Table I

| Example No. | Catalyst | Weight of Catalyst in Grams Used to Treat a 300 Gram Batch of Chromate Liquor | Yield Expressed as percent of the Chromium Recovered in the Precipitate in ½ hr. at 520° F. and 1,650 p. s. i. |
|---|---|---|---|
| I | cupric oxide | 1 | 97 |
| III | cuprous oxide | 1 | 91 |
| IV | cupric hydroxide | 7 | 88 |
| V | cupric chromate | 1 | 96 |
| VI | cupric sulfate | 1 | 97 |
| VII | cupric nitrate | 1 | 99 |
| VIII | cupric oleate | 1 | 96 |
| IX | copper naphthenate | 1 | 96 |
| X | copper acetyl acetone | 1 | 97 |
| XI | finely divided metallic copper (Precipitated) | 1 | 96 |
| XII | nickel oxide | 1 | 46 |
| XIII | nickelic hydroxide | 1 | 38 |
| XIV | Raney nickel catalyst | 1 | 44 |
| XV | Raney cobalt catalyst | 1 | 34 |
| XVI | sponge platinum | 1 | 29 |
| XVII | no catalyst | | 30 |

From Table I it is shown that when a copper bearing catalyst was used in the process of converting sodium chromate to chromic hydroxide, the yield of precipitated chromium was, in each case, 88% or above, while for the non-copper bearing catalysts of comparable sample weight the yield of chromium was below 50%. Furthermore, as shown in Example II, when a copper catalyst is used at the operating conditions of temperature and pressure obtaining in the foregoing examples, the time required for effecting the change from sodium chromate to chromic hydroxide may be reduced to as little as ten minutes.

While the test results of Table I were obtained when the treated chromate liquor was heated at 520° F. and under a pressure of 1650 p. s. i., it should be noted that lower temperatures and/or pressures may be used for the successful conversion of sodium chromate to chromic hydroxide.

When the pressure is maintained at 1650 p. s. i., satisfactory results can be obtained in some instances with a temperature of 350 F. When the temperature is maintained at, or above 520° F., it is possible to obtain good yields with a pressure of 1450 p. s. i. Temperatures above 520° F. may be used if desired, although the temperature should not be above that at which a liquid phase can be maintained in the autoclave.

While in each of the cases given here, wherein a copper bearing catalyst was used, the chromium yield exceeded 88 per cent, and in many instances it was 94 per cent or above, it should be noted that in the reaction of sodium chromate to chromic hydroxide, yields of as low as 50 per cent of the chromium may be acceptable in some circumstances. In cases where such lower yields are acceptable, and a copper bearing catalyst is used, consequent reduction may be made in the operating temperature and pressure, or in the duration of the run.

In this relationship, yields of over 50 per cent of the chromium have been obtained by my process with a temperature of 400° F. and a pressure as low as 700 p. s. i. with a treatment time of 30 minutes. Likewise, when high temperature and pressure are used, i. e. 520° F. and 1650 p. s. i., yields of over 50 per cent can be obtained with a treatment time of 4 minutes or less.

In order to show, experimentally, a comparison between a copper bearing catalyst and that of some other metal, such as nickel, in the reduction of sodium chromate, wherein the exposed area of each catalyst is practically identical, a series of tests were made on wire or wire gauze of similar surface area. In each of these tests the procedure of Example I, above, was repeated, substituting in each case, for the catalyst of Example I, a catalyst as described in the following examples:

EXAMPLE XVIII

The catalyst was copper wire having a diameter of 0.122 inch and a length of 91.5 inches. The surface area of the wire was 35.2 sq. in. A yield of 81% chromium was obtained in this test.

EXAMPLE XIX

The catalyst was nickel wire having a diameter of 0.120 inch and a length of 93.0 inches. The surface area of the wire was 35.1 sq. in. A yield of 28% chromium was obtained.

EXAMPLE XX

The catalyst was a 4 inch by 7 inch piece of copper wire gauze having a wire diameter of 0.0043 inch and a weight of 13.1 grams. The calculated surface area was 75.1 square inches. The yield of chromium was 95%.

EXAMPLE XXI

The catalyst was a 4 inch by 4 inch piece of platinum wire gauze having a wire diameter of 0.0075 inch and a weight of 24.5 grams. The calculated surface area was 33.5 square inches. A yield of 42% chromium was obtained.

A summary of test results for Examples XVIII through XXI is given in Table II below:

Table II

| Example No. | Catalyst | Surface Area in Square Inches of Catalyst Used to Treat a 300 Gram Batch of Chromate Liquor | Yield Expressed as Percent of the Chromium Recovered in the Precipitate in ½ hr. at 520° F. and 1,620 p. s. i. |
|---|---|---|---|
| XVIII | Copper wire | 35.2 | 81 |
| XIX | Nickel wire | 35.1 | 28 |
| XX | Copper wire gauze | 75.1 | 95 |
| XXI | Platinum wire gauze | 33.5 | 42 |

The copper wire in Example XVIII was used only for comparative purposes with other metals of similar surface area. The relatively low yield of chromium (81%) in this example merely indicates that the amount of copper used in this test was below the minimal amount required for the best results. In Example XX, where copper of sufficient surface area was used the chromium yield was high.

I claim:

1. The process which comprises treating an aqueous solution of an alkali chromate with hydrogen in the presence of a material of the group consisting of copper, inorganic copper compounds and organic copper compounds at elevated temperature and pressure for a time sufficient to convert at least 50 per cent of the alkali chromate to chromic hydroxide.

2. The process which comprises treating an aqueous solution of sodium chromate with hydrogen in the presence of a material of the group consisting of copper, inorganic copper compounds and organic copper compounds at elevated temperature and pressure for a time sufficient to convert at least 50 per cent of the sodium chromate to chromic hydroxide.

3. The process which comprises treating an aqueous solution of potassium chromate with hydrogen in the presence of a material of the group consisting of copper, inorganic copper compounds and organic copper compounds at elevated temperature and pressure for a time sufficient to convert at least 50 per cent of the potassium chromate to chromic hydroxide.

4. The process which comprises treating an aqueous solution of sodium chromate with hydrogen in the presence of a material of the group consisting of copper, inorganic copper compounds and organic copper compounds at a temperature of not less than about 400° F. and at a pressure of at least 700 pounds per square inch for a time sufficient to convert at least 50 per cent of the sodium chromate to chromic hydroxide and sodium hydroxide.

5. The process which comprises treating an aqueous solution of sodium chromate with hydrogen in the presence of a material of the group consisting of copper, inorganic copper compounds and organic copper compounds at a temperature of not less than about 400° F. and at a pressure of at least 700 pounds per square inch for at least 30 minutes.

6. The process which comprises treating an aqueous solution of sodium chromate with hydrogen in the presence of a material of the group consisting of copper, inorganic copper compounds and organic copper compounds at a temperature of not less than about 480° F. and at a pressure of at least 1450 pounds per square inch for at least three minutes.

7. The process of reducing sodium chromate which comprises treating an aqueous solution of sodium chromate with hydrogen in the presence of metallic copper at a temperature of not less than about 400° F. and at a pressure of at least 700 pounds per square inch for a time sufficient to convert at least 50 per cent of the sodium chromate to chromic hydroxide and sodium hydroxide.

8. The process of reducing sodium chromate which comprises treating an aqueous solution of sodium chromate with hydrogen in the presence of an inorganic copper compound at a temperature of not less than about 400° F. and at a pressure of at least 700 pounds per square inch for a time sufficient to convert at least 50 per cent of the sodium chromate to chromic hydroxide and sodium hydroxide.

9. The process of reducing sodium chromate which comprises treating an aqueous solution of sodium chromate with hydrogen in the presence of an organic copper compound at a temperature of not less than about 400° F. and at a pressure of at least 700 pounds per square inch for a time sufficient to convert at least 50 per cent of the sodium chromate to chromic hydroxide and sodium hydroxide.

10. The process of reducing sodium chromate which comprises treating an aqueous solution of sodium chromate with hydrogen in the presence of copper oxide at a temperature of not less than about 400° F. and at a pressure of at least 700 pounds per square inch for a time sufficient to convert at least 50 per cent of the sodium chromate to chromic hydroxide and sodium hydroxide.

11. The process of reducing sodium chromate which comprises treating an aqueous solution of sodium chromate with hydrogen in the presence of copper oleate at a temperature of not less than about 400° F. and a pressure of at least 700 pounds per square inch for a time sufficient to convert at least 50 per cent of the sodium chromate to chromic hydroxide and sodium hydroxide.

No references cited.